Oct. 27, 1931.  M. P. HEMPHILL  1,829,280

VEHICLE SPRING

Filed May 28, 1928

Inventor

Manley P. Hemphill;

By Lyon & Lyon

Attorneys

Patented Oct. 27, 1931

1,829,280

UNITED STATES PATENT OFFICE

MANLEY P. HEMPHILL, OF LOS ANGELES, CALIFORNIA

VEHICLE SPRING

Application filed May 28, 1928. Serial No. 281,258.

This invention relates to vehicle springs of the built-up leaf-type such as used largely in automobiles.

In order to prevent rusting and breaking of the leaves, and also to increase the ease of movement of the leaves on each other, it is customary to lubricate the springs.

The general object of this invention is to provide a simple construction for such a spring, which will facilitate the lubrication of the rubbing faces of their leaves; also to provide a construction for the spring that will enable the lubricant to be forced into the spring expeditiously by using a grease pump or "gun" such as are used in greasing the running mechanism of automobiles.

Further objects of the invention will appear hereinafter.

The invention consists of the novel parts and combination of parts to be described hereinafter, all of which contribute to produce an efficient vehicle spring.

A preferred embodiment of the invention is described in the following specifications, while the broad scope of the invention is pointed out in the appended claims.

Figure 1:
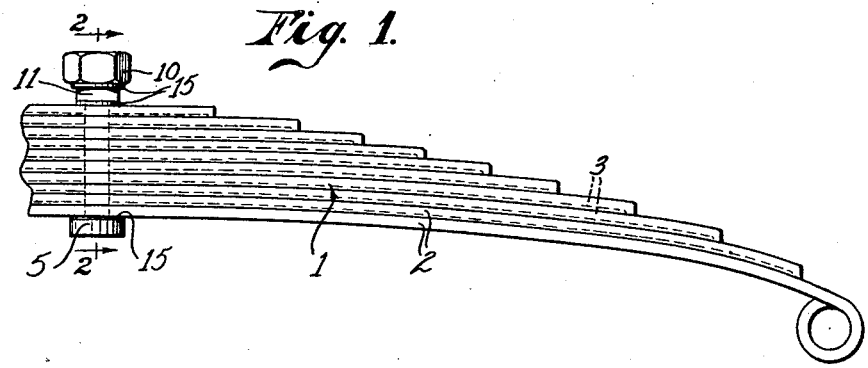
Figure 1 is a side elevation of a spring embodying my invention.
Figure 4:
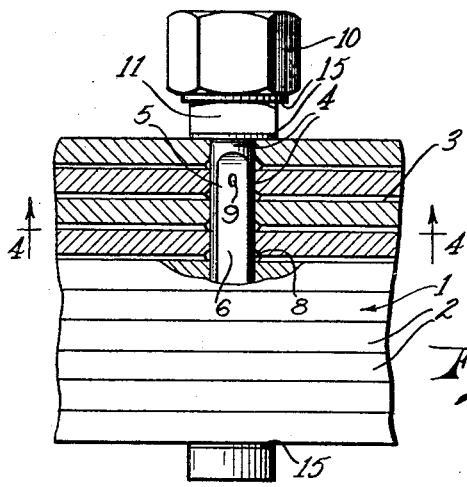
Figure 4 is a plan showing a portion of the middle of a leaf of the spring viewed from the under side and showing the bolt of the spring in cross-section.
Figure 2:
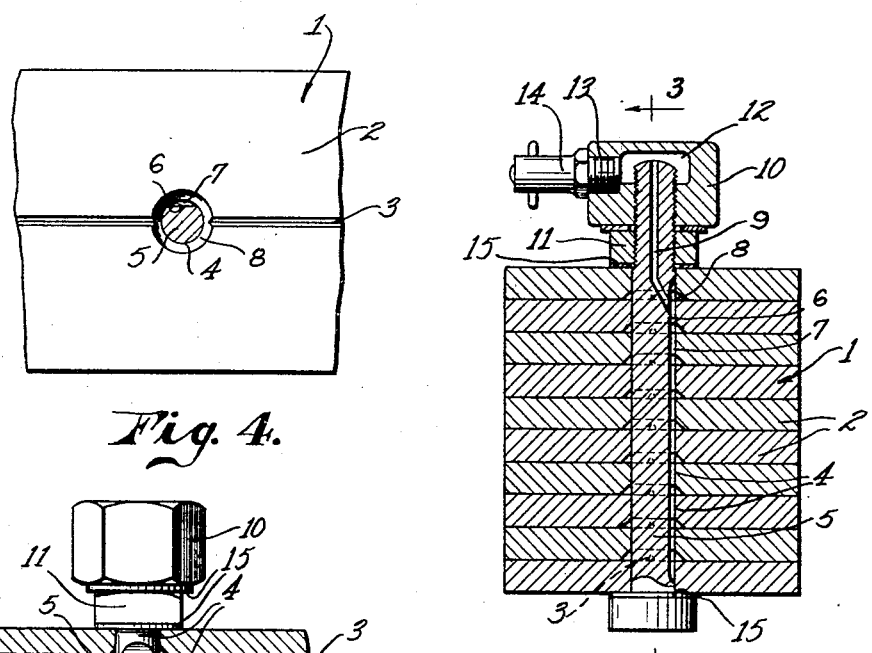
Figure 2 is a cross-section through the spring taken on the line 2—2 of Figure 1 but upon an enlarged scale.
Figure 3:
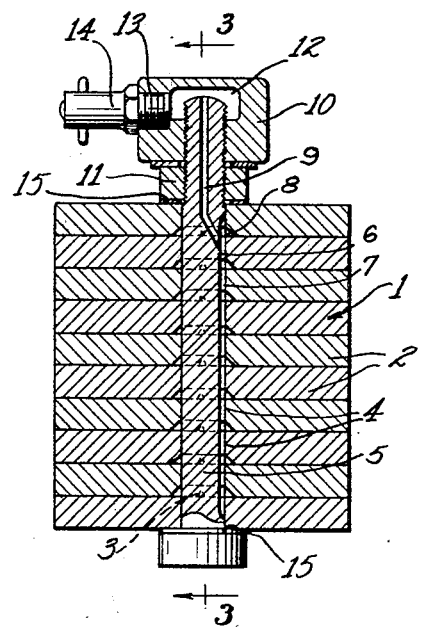
Figure 3 is a side elevation of the middle portion of the spring shown partly in section.

I am aware that constructions for greasing springs have been employed involving the use of a duct passing down the clamping bolt of the spring and communicating with ducts on the faces of the leaves of the spring. In the patented devices for this purpose, however, generally the duct for the grease to pass down the clamping bolt is produced by having the openings in the leaves of the spring slightly larger than the diameter of the bolt. This is objectionable because it permits lateral and longitudinal movements of the leaves of the spring which might place them out of line with each other. In other words, the leaves of the spring can "work" on each other and the clamping bolt does not perfectly center and align the leaves of the spring. A construction has been suggested in which the bolt fills the opening in the spring and in which the bolt is provided with a transverse central slot communicating with a central duct passing down from above, but the slotting of the bolt is a relatively expensive operation, and substantially weakens the bolt. Furthermore, in that construction it is possible for the slot through the bolt to get out of alignment with the longitudinal grooves or ducts in the faces of the leaves. My invention is intended to overcome these difficulties and provide a construction which will enable the leaves of the spring to fit snugly to the clamping bolt and at the same time enable ample duct area to be produced for conveying the grease to the longitudinal ducts or grooves in the faces of the leaves.

In practicing the invention I provide a spring 1 built up of leaves 2 superposed on each other. These leaves are provided with lubricant ducts 3 preferably in the form of a groove in the underface of each leaf and extending longitudinally of the leaf. The clamping means for the leaves is constructed with means for attaching a grease pump or gun so that lubricant under pressure can be forced out into the ducts. For this purpose the middle portions of the leaves are provided with aligning openings. These openings receive the clamping bolt 5 that secures the leaves of the spring together.

According to my invention, I construct the clamping means for the leaves of the spring so that it holds the leaves centered and aligned with respect to each other. When a bolt is employed as the clamping means, the openings in the leaves of the spring are formed so that they fit snugly to the bolt and at the same time provide for the passage of the grease past the upper leaves to the lower leaves, and so that communication is open from the duct at the bolt, into the longitudinal grooves in the faces of the leaves. This may be accomplished in different ways. I have illustrated the preferred way, which involves the use of a flat side on the bolt to provide the duct to conduct the grease down the bolt. The bolt may be provided with this flat face by means of a very inexpensive operation.

In order to admit the lubricant down the bolt and into the ducts I provide the bolt with a flat side face 6 that cooperates with the openings 4 to form a passage 7 for the lubricant communicating with the ducts 3.

The ducts 3 do not extend to the ends of the leaves. Hence, their ends are closed and this facilitates the development of pressure in the ducts with the grease gun to force the lubricant into the cracks between the leaves.

The lubricating of such a spring usually eliminates most of the squeaks or noises occurring in an automobile running on a roadway.

The ducts 3 can be readily formed in the sides of the leaves by employing a die to press them into the steel while hot, so that the expense of applying this improvement to a spring is nominal.

The openings 4 are preferably formed with annular recesses in their edges, that is, they are countersunk on their under sides to form chambers 8 communicating with the passage 7 so as to carry the lubricant around the bolt and supply it equally well to both ends of the spring. The passage 7 is reached through a central port 9 extending into the bolt from its threaded end and emerging on the flat face 6. If desired a grease gun connection could be screwed directly onto the end of the bolt but I prefer to employ a chambered check nut 10 for this purpose, seating on a nut 11. The chamber 12 in this nut is reached through a tapped opening 13 normally closed by a screw plug 14.

Obviously the spring may be constructed with the threaded end of the bolt located below instead of above the spring.

If desired washers 15 of soft metal such as copper may be employed under the head of the bolt and under the nut 11 to act as gaskets to prevent leakage and thereby enable a good pressure to be developed by the grease gun when its hose is attached at the threaded opening 13.

By having the ducts 3 formed in the undersides of the leaves an advantage is derived because the grease will move readily from the duct into the crack between the contacting faces of the leaves.

It is most advantageous to form the grooves 3 in the underface of the leaves because it enables the lubricant to distribute itself between the engaging faces of the leaves until all of the lubricant is used up. If such a groove is formed on the upper face of a leaf, it must overflow along its length in order to supply the lubricant between the leaves at points intermediate of the length of the leaves, and the tendency of the groove formed in the upper face of the leaf is to carry most of the lubricant to the outer end of the leaf carrying the groove; in fact, before all the lubricant is consumed, this will be the only point where the groove is depositing lubricant between the working faces of the leaves.

It is understood that the embodiment of the invention described herein is only one of the many embodiments this invention may take, and I do not wish to be limited in the practice of the invention, nor in the claims, to the particular embodiment set forth.

What I claim is:

1. A spring having a plurality of superposed leaves with aligning bolt openings, and having annular recesses formed in the metal of the leaves around the edges of the openings constituting lubricant ducts in the face of the metal and a clamping bolt fitting snugly in the said bolt openings and having a threaded end with a nut for clamping the leaves together, said nut having a passage therethrough communicating with the said ducts, said leaves further having longitudinal ducts on their faces communicating with the annular ducts, and means for connecting a grease pump to force lubricant under pressure into said ducts.

2. A spring having a plurality of leaves with aligning bolt openings, a bolt fitting in said aligned openings so as to center and align the leaves of the spring, said bolt having a duct on its side face and said leaves having annular grooves pressed into the faces of the leaves at the edges of the openings and having longitudinal grooves in their faces communicating with the said grooves, said bolt having a passage for the lubricant also communicating with said first-named duct, with means for connecting a grease pump to said passage.

3. A spring having a plurality of leaves with aligning bolt openings, a bolt fitting snugly in said aligned openings so as to center and align the said leaves, each leaf having an annular recess formed in its face adjacent its bolt opening and having longitudinal grooves respectively formed in the lower faces of the leaves, communicating with said annular recesses, said bolt having a passage extending through its end, a nut on the threaded end of the bolt and an outer chambered nut on the threaded end of the bolt beyond the first-named nut, and means for connecting a grease pump to the chambered nut to force lubricant under pressure into the spring.

4. In a lubricated spring, the combination of a plurality of leaves with aligning bolt openings, a bolt having a flat side face and fitting snugly in the said aligned openings so as to center and align the said leaves with respect to each other, said bolt cooperating with the aligned openings to form a duct passing through the leaves adjacent said flat face, said leaves each having an annular groove pressed into the metal of its face around the edge of the bolt opening and communicating with the said duct.

5. In a lubricated spring, the combination of a plurality of leaves with aligning bolt openings, a bolt having a flat side face and fitting snugly in the said aligned openings so as to center and align the said leaves with respect to each other, said bolt cooperating with the aligned openings to form a duct passing through the leaves adjacent said flat face, said leaves each having an annular groove pressed into its face around the edge of the bolt opening and communicating with the said duct formed in the openings adjacent the said flat face, said bolt having a passage from its threaded end emerging on said flat face.

6. A spring having a plurality of leaves with aligning bolt openings, a bolt fitting into said aligned openings for connecting the leaves together, each leaf having an annular recess formed adjacent the bolt and having a longitudinal groove formed in its lower face communicating with the annular recess for conducting lubricant longitudinally of the leaf, said bolt having a passage extending through its end and communicating with the recesses for conducting lubricant thereto.

Signed at Los Angeles, Calif., this 18 day of May, 1928.

MANLEY P. HEMPHILL.